Dec. 9, 1947. D. W. MOORE, JR 2,432,327
ELECTRICAL SPEED-RESPONSIVE SYSTEM WITH VARIABLE-RATIO DRIVE
Filed Nov. 17, 1944
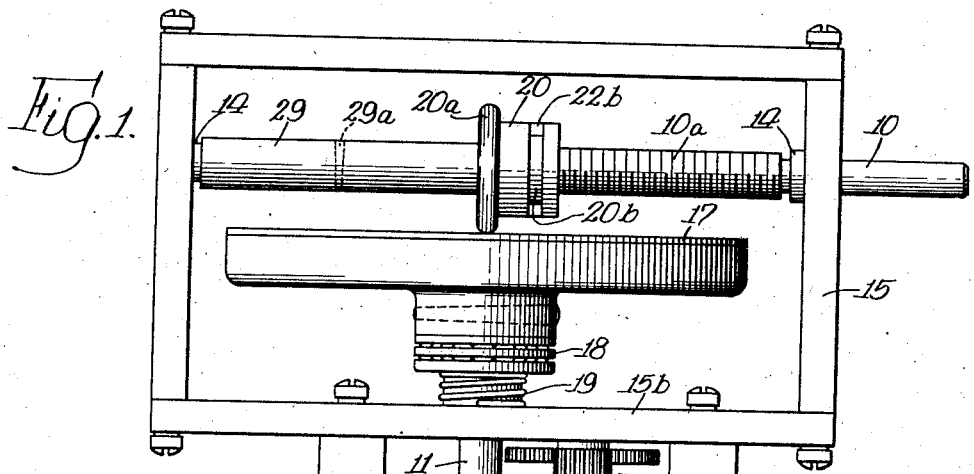
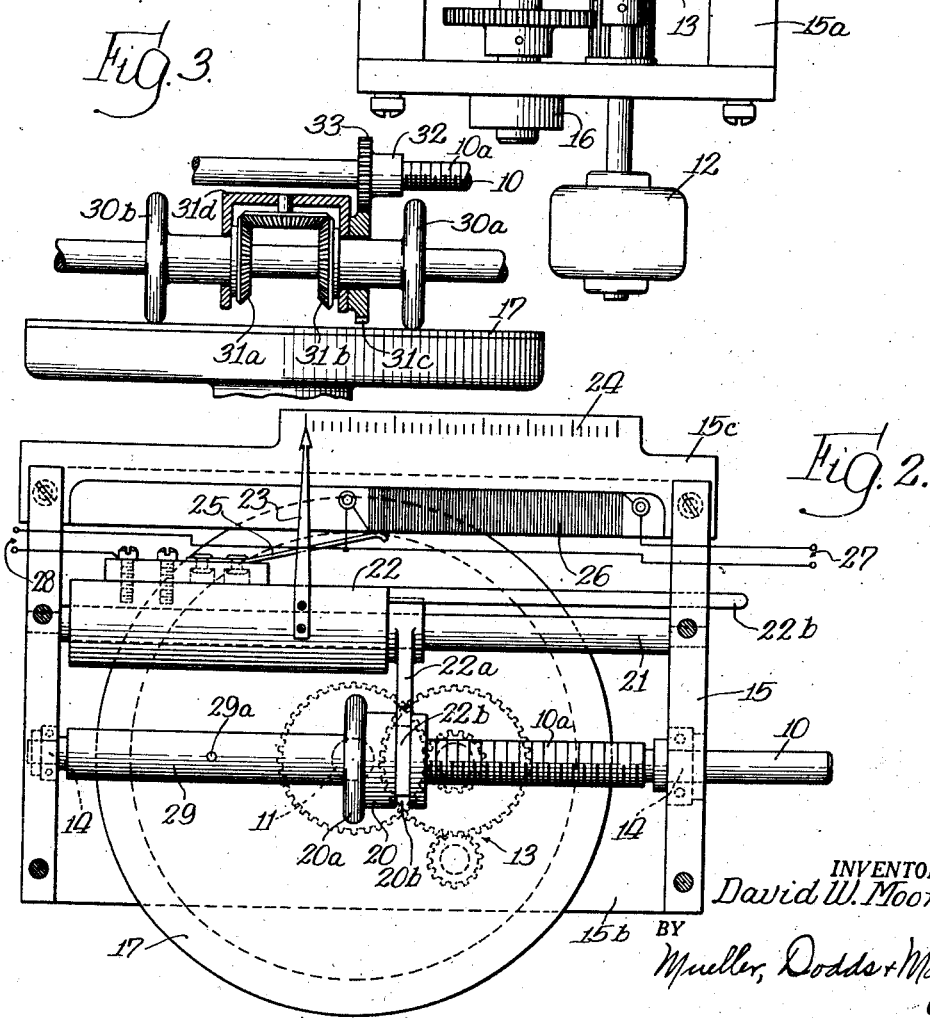
INVENTOR.
David W. Moore Jr.,
BY
Mueller, Dodds & Mason
Atty's Patented Dec. 9, 1947

2,432,327

UNITED STATES PATENT OFFICE 2,432,327

ELECTRICAL SPEED-RESPONSIVE SYSTEM WITH VARIABLE-RATIO DRIVE

David W. Moore, Jr., New York, N. Y., assignor to Fairchild Camera and Instrument Corporation, a corporation of Delaware Application November 17, 1944, Serial No. 563,922

3 Claims. (Cl. 201—48)

1

This invention relates to speed-responsive systems for deriving an electrical signal varying with or representative of the speed of a primary rotating element.

It is frequently desired to obtain an electrical signal representative of the speed of a primary rotating shaft, which effect is needed for introduction into a regulating or controlling system depending upon one or more parameters of which one is speed. It is also desirable to be able to obtain such an effect linearly representative of speed, as contrasted to many speed-responsive devices of the prior art having a square-law or other power-law characteristic and requiring individual calibrating or rectifying arrangements to derive the required linearly-related speed parameter.

It is an object of the invention, therefore, to provide a new and improved speed-responsive system by means of which there may be developed an electrical signal representative of the speed of a rotating element.

It is another object of the invention to provide a new and improved speed-responsive system for deriving an electrical signal representative of the speed of a primary rotating element in which the derived signal is substantially linearly representative of the speed of the primary rotating element.

In accordance with the invention, a speed-responsive system for deriving an electrical signal varying with the speed of a primary rotating element comprises a reference-speed secondary rotating element and a continuously-variable-ratio drive between the primary and secondary elements. This variable ratio drive includes a driven element having a driving connection with both of the primary and secondary elements and the driven element is movable by one of the primary and secondary elements to equalize the speed ratios of its driving engagements with the primary and secondary elements. The system also includes means actuated by the movement of said driven element for deriving an electrical signal representative of the ratio of the speeds of the primary and secondary elements. Preferably the secondary element is a constant-speed rotating element and the derived electrical signal is linearly representative of the speed of the primary element.

For a better understanding of the invention, together with other and further objects thereof, reference is had to the following description taken in connection with the accompanying drawings while its scope will be pointed out in the appended claims.

Referring now to the drawings, Fig. 1 is a side elevation of a speed-responsive system embodying

2 the invention; Fig. 2 is a top plan view of the apparatus of Fig. 1 with the top cover plate removed; while Fig. 3 is a fragmentary view of a modified form of continuous variable-ratio drive which may be utilized in the system of Figs. 1 and 2.

Referring now to Figs. 1 and 2 of the drawings, there is illustrated a speed-responsive system for deriving an electrical signal variable with, preferably linearly representative of, the speed of a primary rotating element or shaft 10. This system includes a reference-speed secondary rotating element or shaft 11 which may be driven by a suitable motor 12 through a gearing 13. Preferably the motor 12 is a constant-speed motor and drives the secondary shaft 11 at constant speed. The shaft 10 is journalled in bearings 14, 14 of a frame 15, while the shaft 11 is journalled in a bearing 16 in an extension 15a of the frame 15 and in a bearing (not shown) in the base plate 15b of frame 15, the axes of the shafts 10 and 11 lying in the same plane and being normal to each other.

The system includes also a continuous variable-ratio drive between the primary shaft 10 and the secondary shaft 11. This variable-ratio drive may take any of several forms, but in a preferred embodiment it consists of a variable-radius driving element such as a friction disc 17 attached to and driven by the secondary shaft 11; the assembly being supported vertically on an antifriction thrust bearing 18 resiliently supported by a spring 19. The variable-ratio drive also includes a constant-radius driven element having a driving engagement with both the driving element 17 and the primary shaft 10. For example, the driven element may comprise a traveling nut 20 having a constant-radius friction roller 20a engaging the friction surface of the disc 17 and a translatory driving engagement with the primary shaft 10, as by being internally threaded and engaging a threaded portion 10a of the shaft 10. Due to the normal relation between the axes of the shafts 10 and 11, the driving surface of the variable-radius device or disc 17 is substantially parallel to the axis of rotation of the primary shaft 10 so that the roller 20a maintains engagement with the disc 17 during its travel along the threaded portion 10a of the shaft 10, this frictional engagement being aided by the spring 19 which biases the disc 17 and roller 20a into engagement.

In order to derive an electrical signal varying with the speed of the primary shaft 10, there is mounted in the frame 15 parallel to the shaft 10 a guide bar 21 on which is mounted a sliding sleeve 22 having an extending arm 22a terminating in a bifurcated yoke 22b engaging an annular recess 20b in the nut 20. By this arrangement, the sleeve 22 is moved transversely in accordance with the movement of the traveling nut 20 on the shaft 10. There is mounted on the sleeve 22 an adjustable sliding contact 25 bearing on an elongated voltage divider resistor 26 supported on the frame 15 parallel to the axis of sleeve 22. The terminals of the voltage divider resistor 26 are connected to suitable supply circuit terminals 27, while electrical signal-output terminals 28 are connected to the adjustable contact 25 and to the terminal 27 connected to the end of the resistor 26 contacted by the element 25 when in the zero position of the system. If desired, a visual indication varying with the speed of the primary shaft 10 may be obtained by attaching to the sleeve 22 a pointer or indicator 23 cooperating with a scale 24 formed on or attached to a member 15c of the frame 15. Also, if desired, a power displacement varying with the speed of the primary shaft 10 may be obtained by means of a push-rod 22b extending from the sleeve 22 and through the frame 15 and effective to actuate any mechanically controllable device.

In applications involving unidirectional operation of primary shaft 10, threaded portion 10a need not be extended to carry the nut 20 beyond its zero position in which the roller 20a contacts the center of the disc 17, and there may be provided a sleeve 29 mounted on the shaft 10 and secured thereto by a key 29a and serving as a stop, preventing the movement of the nut 20 beyond its zero position.

It is believed that the operation of the system illustrated will be apparent from the foregoing description. In brief, however, assuming that the secondary shaft 11 and the friction disc 17 are rotating and that the primary shaft 10 is stationary, the parts are in the relative positions shown in Figs. 1 and 2. If now the shaft 10 is rotated, the traveling nut 20 will be engaged by the threaded portion 10a of the shaft 10 and will be moved axially of the primary shaft 10 by its translatory or threaded engagement therewith to equalize the speed ratios of its driving engagements with the primary shaft 10 and the secondary shaft 11, that is, until the roller 20a has the same peripheral speeds with respect to the axes of rotation of both of the shafts 10 and 11. At this point, the speed of rotation of the nut 20, as driven by the disc 17, corresponds to the speed of rotation of the shaft 10 and there will be no further axial or translatory movement of the nut 20. Axial movement of the driven element or nut 20 along the shaft 10 actuates the sleeve 22 and the adjustable contact 25 of voltage divider 26 to develop at the terminals 28 an electrical signal or a resistance value representative of the ratio of the speeds of the primary shaft 10 and secondary shaft 11. If the voltage-divider 26 has a linear displacement-resistance characteristic, the electrical signal developed at the output terminals 28 will be linearly representative of the ratio of the speeds of the shafts 10 and 11. Similarly the signal output at terminals 28 may be made to represent any desired function of the ratio of the speeds of the shafts 10 and 11 by properly shaping the displacement - resistance characteristic of voltage divider 26. At the same time, axial movement of the sleeve 22 moves the pointer 23 along the scale 24, the movement of these elements giving a visual indication representative of the ratio of the speeds of the primary shaft 10 and the secondary shaft 11. Also, the axial movement of sleeve 22 results in movement of the push-rod 22b to actuate any suitable mechanically controllable device.

In the preferred embodiment of the speed-responsive system illustrated and described, the motor 12 and secondary shaft 11 rotate at constant speed and the output effects, that is, the electrical signal, the visual indication and the power displacement, are linearly representative of the speed of the primary shaft 10. However, by a proper tapering or shaping of the displacement-resistance characteristic of the resistor 26, the output electrical signal or resistance value may be made to follow any predetermined function of the speed of the primary shaft 10. However, if the motor 12 and secondary shaft 11 rotate at a variable speed, the output electrical signal is representative of the ratio of the speed of the shaft 10 to that of the shaft 11. In this latter case, either shaft may be considered as the primary shaft and the other, the secondary shaft.

In the apparatus illustrated in Figs. 1 and 2, when the primary shaft 10 is not rotating and the roller 20a is at the center of the disc 17, there is a slight wear on the roller 20a due to the rotation of the disc 17. This may be avoided by the modified construction shown schematically in Fig. 3 in which the single roller 20a is replaced by a pair of rollers 30a and 30b actuating the crown gears 31a, 31b of a differential mechanism. The ring gear 31c of the differential, attached to the housing 31d, drives the traveling nut 32 through a gear 33, the nut 32 engaging the threaded portion 10a of shaft 10, in a manner similar to the structure of Fig. 1, and driving the indicating pointer 23 and adjustable contact 25 in a similar manner, by mechanism not shown.

In the operation of the apparatus of Fig. 3 the rollers 30a and 30b are disposed to rotate on opposite sides of the center of the disc 17 and the design constants of the apparatus are so selected that, for the range of speed of the primary shaft 10 to be measured, neither of the rollers 30a and 30b moves beyond the center of the disc 17. With this arrangement the rollers 30a and 30b always rotate, but in opposite directions. The ring gear 31c is driven at a speed which is the average of the speeds of the rollers 30a and 30b and corresponds to the speed of the disc 17 at a point immediately beneath the center point of the differential gear 31a, 31b, 31c. The traveling nut 32 is driven, therefore, in a manner exactly similar to the structure of Figs. 1 and 2 and the visual indication and developed output electrical signal are in all respects similar to those obtained by the structure of Figs. 1 and 2.

While the variable-radius driving element of the invention has been illustrated as a friction disc, it will be apparent that there may be substituted therefor a tapered pulley or drum or other equivalent variable-radius driving element.

While there have been described what are at present considered to be the preferred embodiments of the invention, it will be apparent to those skilled in the art that various changes and modifications may be made therein without departing from the spirit or scope of the invention.

What is claimed as new is:

1. A speed-responsive system for deriving an electrical signal varying with the speed of a primary rotating element comprising, a reference-speed secondary rotating element, a continuously variable-ratio drive between said primary and secondary elements including a driven element having a driving connection with both said primary and secondary elements, said driven element being movable by one of said primary and secondary elements to equalize the speed ratios of its driving engagements with said primary and secondary elements, and means actuated by the movement of said driven element for developing an electrical signal representative of the ratio of the speeds of said primary and secondary elements.

2. A speed-responsive system for deriving an electrical signal representative of the speed of a primary rotating element comprising, a constant-speed secondary rotating element, a continuously variable-ratio drive between said primary and secondary elements including a driven element having a driving connection with both said primary and secondary elements, said driven element being movable by one of said primary and secondary elements to equalize the speed ratios of its driving engagements with said primary and secondary elements, and a voltage divider having an adjustable contact actuated by the movement of said driven element for developing an electrical signal representative of the speed of said primary element.

3. A speed-responsive system for deriving an electrical signal representative of the speed of a primary rotating element comprising, a constant-speed secondary rotating element, a continuously variable-ratio drive between said primary and secondary elements including a driven element having a driving connection with both said primary and secondary elements, said driven element being movable axially by one of said primary and secondary elements to equalize the speed ratios of its driving engagements with said primary and secondary elements, an elongated resistor disposed parallel to the axis of said driven element, and an adjustable contact actuated by said driven element and cooperating with said resistor to provide a resistance value representative of the speed of said primary element.

DAVID W. MOORE, Jr.

REFERENCES CITED

The following references are of record in the file of this patent:

UNITED STATES PATENTS

| Number | Name | Date |
|---|---|---|
| 706,554 | Hall | Aug. 12, 1902 |
| 805,504 | Trufant | Nov. 28, 1905 |
| 1,292,315 | Heath | Jan. 21, 1919 |
| 1,669,107 | Umansky | May 8, 1928 |
| 1,961,350 | Grunsky | June 5, 1934 |
| 2,089,878 | Corbin | Aug. 10, 1937 |
| 2,136,213 | Hodgman | Nov. 8, 1938 |
| 2,263,371 | Tolnai | Nov. 8, 1941 |

FOREIGN PATENTS

| Number | Country | Date |
|---|---|---|
| 217,363 | Switzerland | Feb. 2, 1942 |